(No Model.) 2 Sheets—Sheet 1.
J. R. HAMILTON.
WATER RESERVOIR FOR SURGICAL USES.

No. 373,400. Patented Nov. 15, 1887.

Witnesses
W. W. Wait.
J. H. Reed

Inventor
Jonathan R. Hamilton
By his Attorney
P. H. Gunckel (No Model.) 2 Sheets—Sheet 2.

J. R. HAMILTON.
WATER RESERVOIR FOR SURGICAL USES.

No. 373,400. Patented Nov. 15, 1887.

Witnesses:
W. W. Wait.
J. H. Reed.

Inventor:
Jonathan R. Hamilton
By P. H. Gunckel
Attorney.

UNITED STATES PATENT OFFICE.

JONATHAN R. HAMILTON, OF MINNEAPOLIS, MINNESOTA, ASSIGNOR OF ONE-HALF TO LYMAN R. PALMER, OF SAME PLACE.

WATER-RESERVOIR FOR SURGICAL USES.

SPECIFICATION forming part of Letters Patent No. 373,400, dated November 15, 1887.

Application filed July 14, 1887. Serial No. 244,236. (No model.)

*To all whom it may concern:*

Be it known that I, JONATHAN R. HAMILTON, a citizen of the United States, residing at Minneapolis, in the county of Hennepin and State of Minnesota, have invented certain new and useful Improvements in Water-Reservoirs for Use in Surgery, of which the following is a specification.

My invention relates to apparatus for use in connection with surgical operations, for warming water and conducting it under pressure through hose to the parts to be cleansed.

The object of the invention is to provide devices for heating the water to the desired temperature, and for regulating the force of the jet applied.

The invention consists, generally, in a cylindrical vessel having an inlet at the top and an outlet at the bottom, the former connected with a pipe supplying water under pressure and the latter provided with a flexible hose. An exterior pipe connects the upper and lower portions of the vessel, and a piston in the vessel expels the water with force through the hose, by reason of water-pressure above the piston. A lamp beneath the vessel is used for heating the water.

The improvements will be hereinafter more fully described, and particularly pointed out in the claims.

Figure 1:
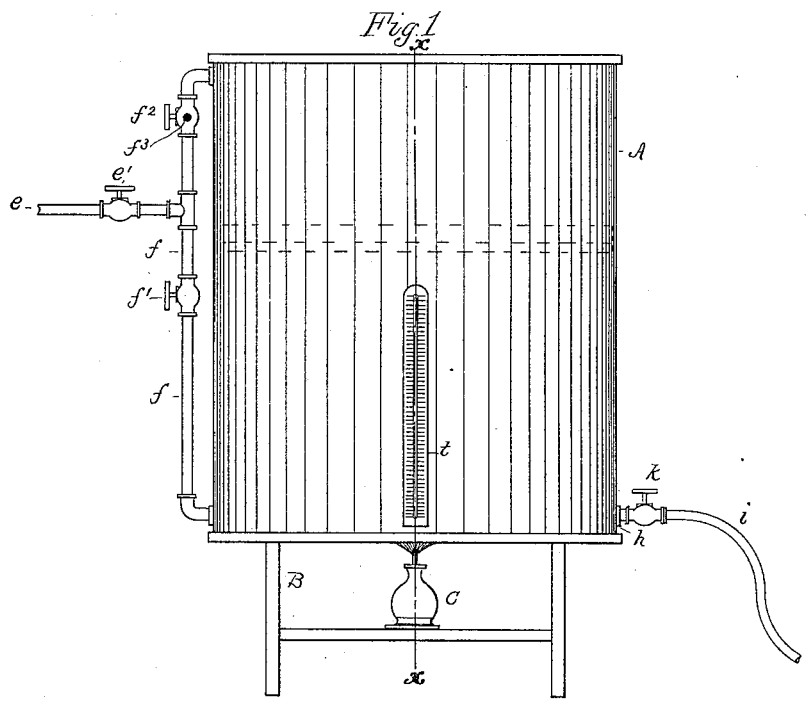
Figure 2:
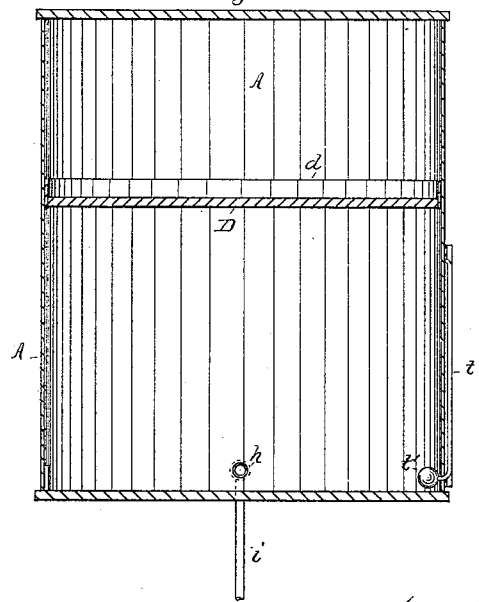
Figure 3:
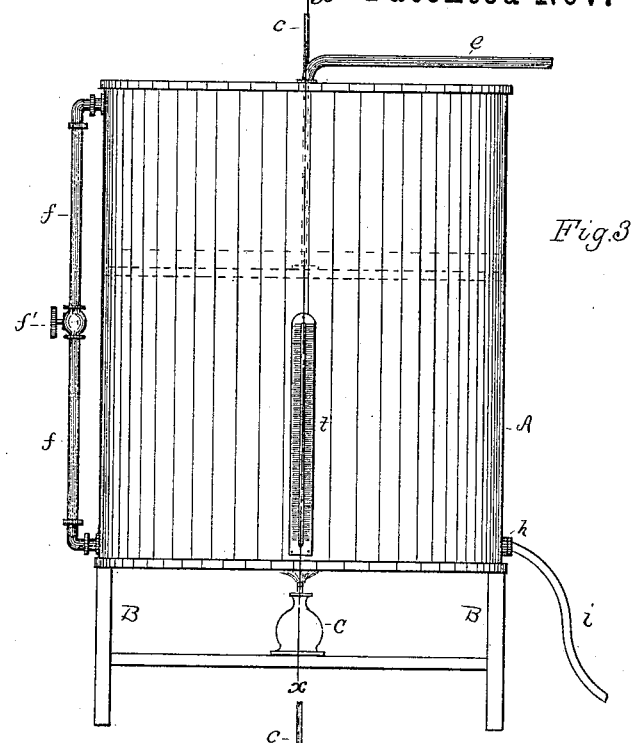
Figure 4:
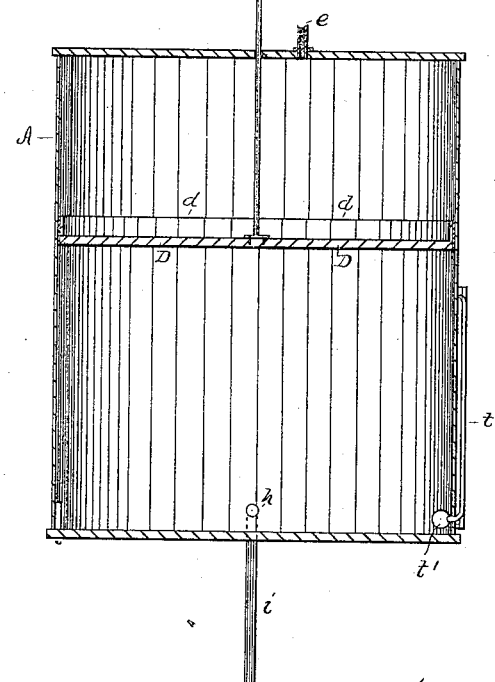

In the accompanying drawings, Figure 1 is a front elevation of the apparatus. Fig. 2 is a vertical sectional view of the same on the line $xx$ of Fig. 1, and Figs. 3 and 4 are similar views of a modified construction of the apparatus.

A in the drawings designates a cylindrical vessel of any desirable size, and B a bracket or other suitable support for the vessel. C is a lamp on a shelf of the bracket in position to have its flame in contact with the bottom of the vessel A.

D is a piston fitting closely in the vessel A, and provided with a flange, $d$, to prevent it from tilting, as it is made to slide in the vessel. The piston may be packed around its sides.

$e$ is a pipe for supplying water under pressure from a water-works system or other source, and is connected to a branch pipe, $f$, extending from the top to the bottom of the vessel along its outside.

The pipe $e$ has a stop-cock, $e'$, for controlling the passage of water, and the pipe $f$ also has a stop-cock, $f'$, below its connection with the pipe $e$, for regulating the flow to the lower portion of the vessel as desired. Above the connection of the two pipes is a two-way cock, $f^2$, having an outlet-opening, $f^3$, in the side, to which a hose may be connected for discharging the water from the vessel above the piston. One position of the cock connects the portion of the pipe $f$ above the cock with the vent $f^3$, while shutting off communication with the portion below, and another position closes the vent and opens the direct passage-way through the pipe $f$ to the vessel.

A thermometer, $t$, outside of the vessel, has its bulb $t'$ within the vessel near the bottom, for ascertaining the temperature of the water.

An outlet, $h$, near the bottom of the vessel, has connected to it a hose, $i$, for conducting the warm water to the place of use. A cock, $k$, is provided for regulating the discharge.

In use water is introduced below the piston by closing the upper portion of the pipe $f$, by means of the cock $f^2$, and opening the cocks $e'$ and $f'$, until the desired quantity has been admitted. When the water has been sufficiently heated by the lamp C, the cocks $e'$ and $f^2$ are opened to fill the chamber above the piston and subject the piston to the pressure of the supply system. The cock $k$ may then be opened to permit the warm water to flow out through the hose $i$. When the water has been exhausted below the piston and the vessel is filled above the piston, the lower portion can be again supplied and the water above the piston drawn off by turning the cock $f^2$ to the position that connects the opening $f^3$ with the upper portion of the pipe $f$, and opening the cocks $e'$ and $f'$, so that water from the pipe $e$ will flow into the lower chamber, and the water above the piston discharge from the vent $f^3$ as the piston rises.

In the modification shown in Figs. 3 and 4 the inlet-pipe $e$ is connected directly to the upper portion of the vessel, and the pipe $f$ has only one stop-cock, $f'$. The piston has a rod, $c$, extending through the head of the vessel A, by means of which the piston can be lifted manually to exhaust the water from above the piston and cause it to descend to the chamber below through the pipe $f$, the cock $f'$ being open. Suitable stop-cocks (not shown) should be provided for the inlet-pipe $e$ and outlet $h$.

What I claim, and desire to secure by Letters Patent, is—

1. In combination, a suitable vessel, a piston therein, an exterior pipe connecting portions of the vessel above and below the piston, a water-supply pipe for introducing water above the piston, suitable cocks for said pipes, means for heating water under the piston, and a discharge outlet and hose for the warm water, substantially as set forth.

2. The combination, with a suitable vessel having an inlet-opening in its upper portion and an outlet in its lower portion, pipes or hose connected with such openings, and suitable cocks therefor, a piston in said vessel, means for heating water below the piston, and a pipe connecting the upper and lower portions of the vessel, substantially as set forth.

3. In combination, a suitable vessel, a piston therein, means for heating water below the piston, a water-outlet near the base, a pipe connecting the chambers above and below the piston, a stop-cock therefor, a water-supply pipe connected thereto above the stop-cock, and a cock above said pipe connections adapted to open the passage-way to the vessel, or to close the same and open a passage-way from the vessel to a discharge-opening, substantially as and for the purpose set forth.

4. The combination, with the vessel A, of the piston D, the pipe $f$, having cocks $f'$ $f^2$ and vent $f^3$, the pipe $e$, having the cock $e'$ and connected to the pipe $f$, and the discharge-opening $h$ and its base $i$ and cock $k$, substantially as set forth.

JONATHAN R. HAMILTON.

Witnesses:
JOHN H. REED,
P. H. GUNCKEL.